Sept. 19, 1939.   T. L. THURLOW ET AL   2,173,142
OPTICAL SYSTEM FOR SEXTANTS AND THE LIKE
Filed Aug. 3, 1937
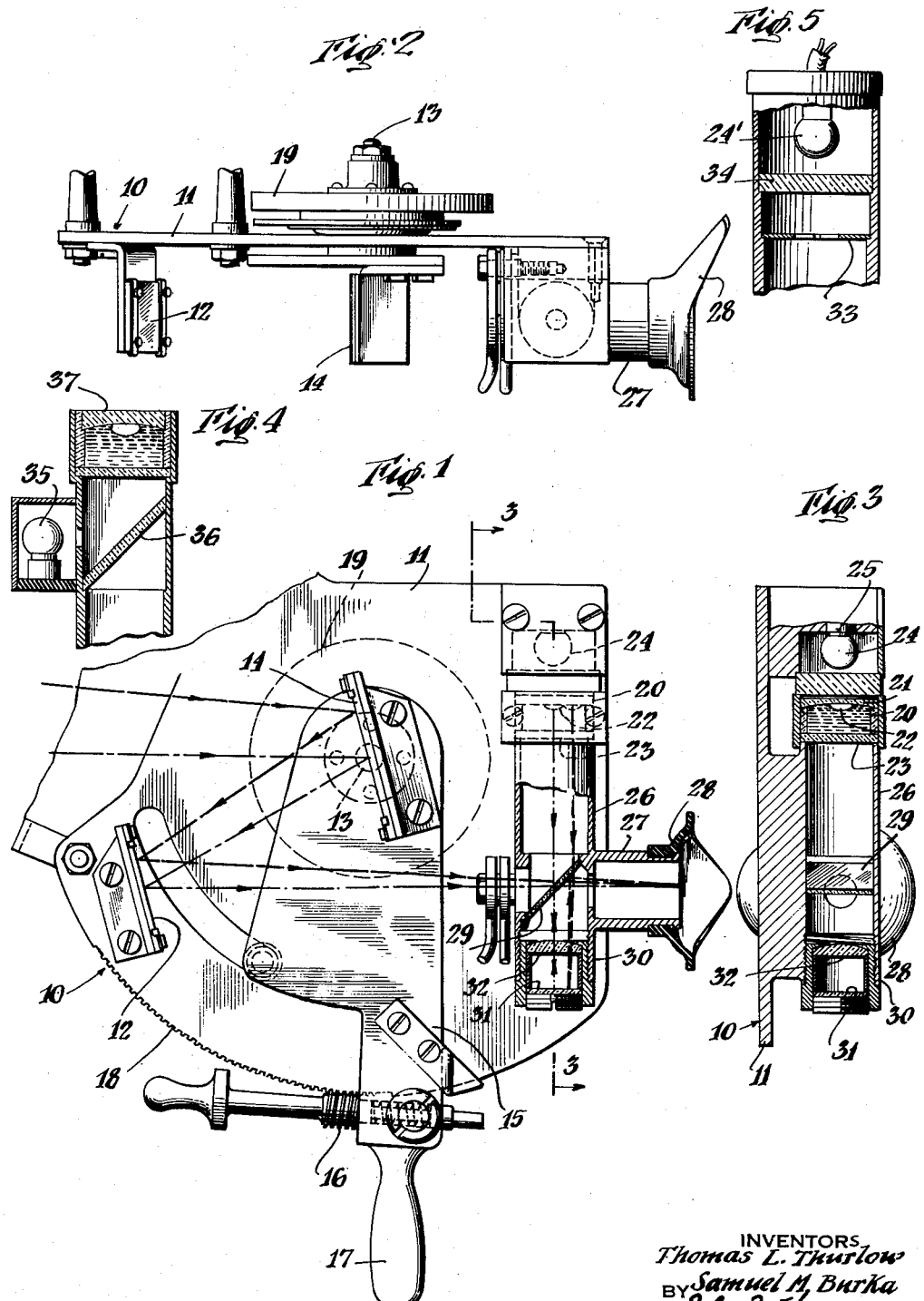
INVENTORS
Thomas L. Thurlow
Samuel M. Burka
BY
ATTORNEYS Patented Sept. 19, 1939

2,173,142

UNITED STATES PATENT OFFICE 2,173,142

OPTICAL SYSTEM FOR SEXTANTS AND THE LIKE

Thomas L. Thurlow and Samuel M. Burka, Dayton, Ohio

Application August 3, 1937, Serial No. 157,164

4 Claims. (Cl. 88—2.3)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to optical systems for altitude or angle-measuring devices, and has particular reference to an improved level or other index-indicating optical system for such instruments.

In accordance with the present invention an optical system for sextants and the like is provided in which the optical parts of the system are so arranged as to produce a more compact system than those heretofore employed; a system in which the image of the level-indicating element appears to move in the same direction and at the same rate as the erect image of the observed object when the instrument is tilted; and a system in which it is unnecessary to maintain the level-indicating element in the center of the field of view.

The optical system of this invention comprises a plane reflector, a plane transparent member inclined between said reflector and the level-indicating element, and a single lens positioned between the member and the reflector and so placed that the level-indicating element is in the focal plane of the lens reflector combination, whereby the image-forming rays from the level-indicating element pass twice through the same lens, i. e., through the plane member and the lens, from the reflector and back through the lens, which renders the rays parallel and they are then reflected by the plane member into the eye of the observer, thus providing the advantages mentioned.

For a more complete understanding of the invention, reference may be had to the accompanying drawing, in which:

Figure 1 illustrates the optical system of this invention shown by way of example as applied to a marine type sextant, the optical system being illustrated in partial axial section;

Fig. 2 is a plan view thereof;

Fig. 3 is an axial section through the system as seen along the line 3—3 of Fig. 1;

Fig. 4 is a partial section through the preferred dark field bubble illumination arrangement for the system; and Fig. 5 is a partial axial section through a modification of the system.

Referring to Figs. 1 and 2 of the drawing, numeral 10 designates a more or less conventional marine type of sextant, including the frame 11 having secured thereto the plane horizon mirror 12 and having journalled therein the index shaft 13 carrying the plane index mirror 14, which is roughly adjustable with respect to mirror 12 in accordance with the observed angle by means of radius arm 15 secured to shaft 13 and bearing handle 17, the fine adjustment being obtained by a tangent worm 16 pivotally carried by radius arm 15 and meshing with a worm sector 18 on the edge of frame 11. A dial 19 is provided on radius arm 15 for indicating the adjusted angle of index mirror 14 with respect to horizon mirror 12. When index mirror 14 is parallel to horizon mirror 12 the instrument is set to measure zero degrees altitude.

The means for indicating the level of the instrument is preferably a bubble cell 20, comprising a transparent meniscus glass cap 21, the under surface of which is concave and against which the bubble 22 moves in the transparent liquid within the cell 20, whose base plate 23 is a plane transparent glass. The bubble 22 may be illuminated at night by a small incandescent lamp 24 energized by a battery cell 25 preferably carried on the frame 11, the bubble appearing in an illuminated field. The bubble cell 20 is located on the axis of a vertical branch tube 26 prependicularly intersecting horizontal sight tube 27, fitted with the non-optical eye-piece 28.

Instead of the usual prismatic reflecting system, the optical system of the present invention includes the transparent plane glass plate 29, inclined at an angle of 45° to the sight axis and positioned at the intersection of the axes of the sight and branch tubes 27 and 26, respectively. The base of the short lower extension 30 of the branch tube 26 is fitted with a plane mirror 31, and the lens 32 is interposed between transparent plate 29 and plane mirror 31. The bubble 22 is placed in the focal plane of the lens 32 and mirror 31 combination, and the radius of curvature of the level cap 21 is substantially equal to the focal length of the lens 32 and mirror 31 combination. When mirror 31 is in proper position with respect to lens 32, a virtual image of the bubble 22 is formed above the actual bubble cell 20.

In operation, the light rays from the level bubble cell 20 pass through the glass plate 29, through lens 32, whereby they are rendered nearly parallel, are then reflected from plane mirror 31 back through lens 32 and thus rendered exactly parallel for reflection from glass plate 29 into the eye-piece 28. Light from the observed celestial object whose altitude is to be measured is reflected from the index mirror 14, to horizon mirror 12, through glass plate 29, and into the eye-piece 28, approximately along the dot-and-dash lines indicated in Fig. 1.

When the instrument is tilted, that is, rotated in the plane of the drawing, the image of the bubble 22 appears to move in the same direction and at the same rate as the image of the celestial body appears to move, disregarding bubble acceleration. The dotted lines in Fig. 1 indicate the direction of rays from an arbitrarily selected celestial body, the dot-and-dash lines representing a ray before and the dotted lines representing the same ray after rotation of the instrument in the plane of the drawing. Rays from the bubble for the corresponding positions of the instrument are also represented by dot-and-dash and dotted lines, respectively. Collimation, or coincidence of the images of the selected celestial body and the bubble may be effected throughout the field of view.

It will be seen that the improved optical system for transmitting the image to the eye in sextants, octants or other altitude or angle-measuring instruments employing a relatively fixed index or artificial horizon such as a level, gyrostat, pendulum or the like, renders the instrument more compact than with other systems, produces an erect image at infinity with but one lens, eliminates the disadantage of maintaining the level-indicating element in the center of the field of view when making an observation, and provides other apparent advantages.

Although light field illumination of the bubble for night use is illustrated in Fig. 3, the dark field illumination obtained by the simple arrangement of Fig. 4 is preferred, in which the lamp 35 is positioned adjacent the tube 26 and light therefrom is reflected by an inclined plane glass plate 36 through which the bubble cell 20 from below, so that the bubble appears bright in a dark field. The top plate 37 of the bubble cell 20 is clear glass, so that for daylight use the bubble is illuminated from above, being clearly visible through the glass plate 36.

The optical system of this invention may also be employed with instruments which do not employ level-indicating elements or do not have their level-indicating elements in the field of view. For example, as shown in Fig. 5, the system may be modified by replacing the bubble cell 20 with a reticule 33 of conventional form comprising a dark or opaque field with a crossed slit therein through which light from the lamp 24' and diffusing disc 34 passes to form a cross-shaped image visible to the observer after the light passes through the inclined plate 29 and lens 32 and is reflected by mirror 31 back through lens 32 upon the inclined plate 29 as before. So modified, the optical system may be employed on instruments for aligning objects, such as aeronautical drift sights and the like, in which the characteristics of the system, viz., the apparent position of the reticule image at infinity and the parallel rays reflected into the eye regardless of the position of the eye, and the like, will be found advantageous.

Although the present invention has been described as particularly applicable to sextants, octants, and other altitude, angle-measuring and aligning instruments, the invention is not limited thereby, but is susceptible of variations in form and detail within the scope of the appended claims.

We claim:

1. In an optical system for an observation instrument employing a liquid level having a bubble, the combination of a support for the level, a reflector for the bubble mounted on the support, a transparent member on the support inclined in the line of sight and interposed between the bubble and said reflector, a lens on the support interposed between said reflector and said transparent member, said lens being so placed that said bubble is approximately in the focal plane of the lens-reflector combination, and means constraining the relative movement of said bubble to an arc having a radius substantially equal to the focal length of the lens-reflector combination, whereby the light from the bubble passes twice through said lens and is reflected by said member into the eye of the observer.

2. In an optical system for an observation instrument employing a liquid level having a bubble, the combination of a support for the level, a reflector for the bubble mounted on the support, said bubble and reflector being so positioned that the rays forming the image of the bubble are substantially perpendicular to the line of sight, a transparent member on the support inclined in the line of sight and positioned between the bubble and said reflector, and a lens on the support interposed between said reflector and said member, said lens being so placed that said bubble is approximately in the focal plane of the lens-reflector combination, whereby the light from said bubble passes twice through said lens and is reflected by said member into the eye of the observer.

3. In an optical system for an observation instrument employing a liquid level having a bubble, the combination of a support for the level, a reflector for the bubble mounted on the support, means mounted on the support in the line of sight and interposed between the bubble and said reflector and adapted both to transmit and reflect light, a lens on the support interposed between said reflector and said means, and means constraining the relative movement of said bubble to an arc having a radius substantially equal to the focal length of the lens reflector combination whereby the light from the bubble passes twice through said lens and is reflected by said first-mentioned means into the eye of the observer.

4. In an optical system for an observation instrument employing a liquid level having a bubble, the combination of a support for the level, a reflector for the bubble mounted on the support, means mounted on the support in the line of sight and interposed between the bubble and said reflector and adapted both to transmit and reflect light, a lens on the support interposed between said reflector and said means, means constraining the relative movement of said bubble to an arc having a radius substantially equal to the focal length of the lens reflector combination whereby the light from the bubble passes twice through said lens and is reflected by said first-mentioned means into the eye of the observer, and a source of illumination mounted on said support adjacent said liquid level and adapted to illuminate said bubble whereby the bubble appears illuminated upon a dark field.

THOMAS L. THURLOW.
SAMUEL M. BURKA.